United States Patent [19]

Koitabashi

[11] Patent Number: 4,632,236

[45] Date of Patent: Dec. 30, 1986

[54] ELECTROMAGNETIC CLUTCH HAVING HIGH TORQUE TRANSFER

[75] Inventor: Takatoshi Koitabashi, Annaka, Japan

[73] Assignee: Sanden Corporation, Gunma, Japan

[21] Appl. No.: 550,492

[22] Filed: Nov. 10, 1983

[30] Foreign Application Priority Data

Nov. 10, 1982 [JP] Japan .................. 57-170814[U]
Jan. 26, 1983 [JP] Japan .................. 58-9294[U]

[51] Int. Cl.$^4$ .................................. F16D 27/14
[52] U.S. Cl. ........................... 192/84 C; 192/107 M
[58] Field of Search ............. 192/84 C, 107 M, 107 R

[56] References Cited

U.S. PATENT DOCUMENTS

| | | | |
|---|---|---|---|
| 1,657,265 | 1/1928 | Ludwig | 192/107 R |
| 2,942,710 | 6/1960 | Wiedmann | 192/107 M |
| 2,965,205 | 12/1960 | Winchell | 192/107 R X |
| 3,048,250 | 8/1962 | Kershner | 192/107 R |
| 3,434,676 | 3/1969 | Bogue | 192/107 M |
| 3,550,739 | 12/1970 | Wiltsey | 192/107 M X |
| 3,584,718 | 6/1971 | Schiefer | 192/107 M X |
| 3,750,788 | 8/1973 | Heinemann | 192/107 M |
| 3,848,313 | 11/1974 | Guyonnet | 192/107 M |
| 3,899,050 | 8/1975 | Savary et al. | 192/107 M |

FOREIGN PATENT DOCUMENTS

| | | | |
|---|---|---|---|
| 681214 | 3/1964 | Canada | 192/107 M |
| 193064 | 2/1923 | United Kingdom | 192/107 R |

*Primary Examiner*—Leonard E. Smith

*Attorney, Agent, or Firm*—Banner, Birch, McKie & Beckett

[57] ABSTRACT

A high torque transfer electromagnetic clutch having a rotor which is rotated by an external driving power source through a belt, an armature plate attached to a drive shaft and an electromagnetic means for selectively attracting the armature plate into engagement with the rotor for transmitting the rotation of the driving power source to the drive shaft via respective frictional surfaces. In one embodiment of the invention, one frictional surface is machined to a rough surface with a plurality of uniformly formed peaks, each peak having an acute shape. The surface is then covered with a film layer of plating. The other frictional surface is finished by polishing. When the frictional surfaces engage, particles from the film layer are shaved off and accumulated in minute depression in the other frictional surface. Particles are also shaved from the other frictional surface and adhere to the film layer particles to form a material which exhibits a high resistance to the shear forces created by the rotating rotor. Accordingly, the level of torque transferred by the clutch is increased.

In other embodiments of this invention, the peaks of the machined frictional surface are trapezoidal in shape, thus providing more contact surface upon engagement of the frictional surfaces and thereby increasing the amount of torque transferred. In a further embodiment of the invention, the film layer is formed from a powder material.

11 Claims, 8 Drawing Figures

ELECTROMAGNETIC CLUTCH HAVING HIGH TORQUE TRANSFER

BACKGROUND OF THE INVENTION

This invention relates generally to an electromagnetic clutch and, more particularly, to an improved clutch rotor and armature plate which increases the torque transfer of the clutch.

Electromagnetic clutches are well known in the art and are often used for controlling the transfer of power from an automobile engine to the refrigerant compressor of the automobile's air conditioning system. The basic construction and operation of these types of clutches are also well known in the prior art. Examples of such clutches may be found in prior U.S. Pat. Nos. 3,044,594 and 3,082,933.

Figure 1:
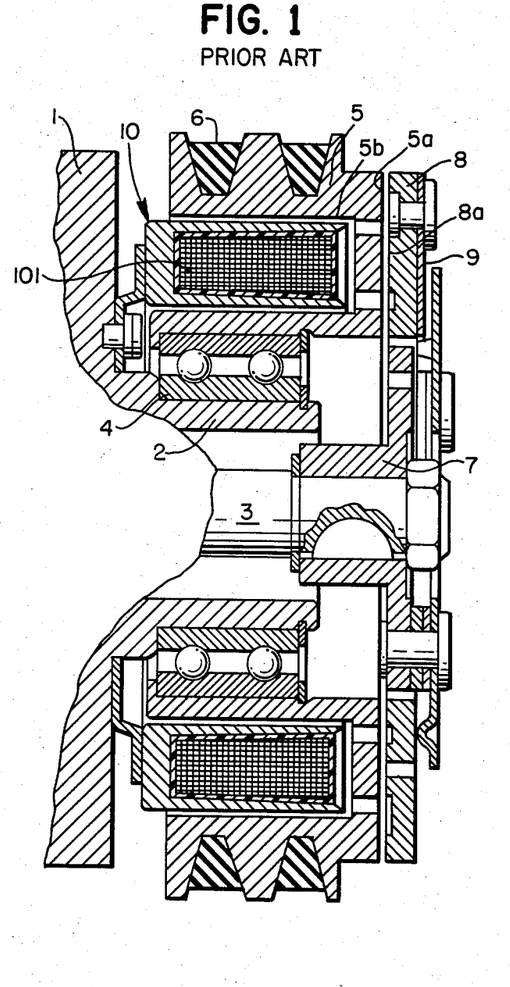
FIG. 1 is a cross-sectional view of an electromagnetic clutch known in the prior art.
Figure 2:
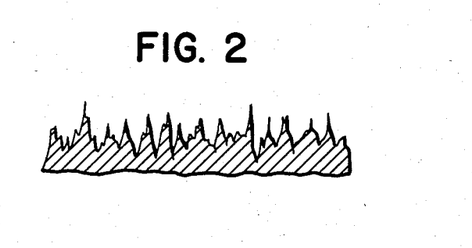
FIG. 2 is an illustrative cross-sectional view of the frictional surface of the rotor of the electromagnetic clutch shown in FIG. 1.

With reference to FIGS. 1 and 2, an electromagnetic clutch of the type known in the prior art will be described. FIG. 1 is a cross-sectional view showing an electromagnetic clutch mounted on a refrigerant compressor. The clutch is disposed on the outer peripheral portion of tubular extension 2 which projects from an end surface of compressor housing 1. Tubular extension 2 surrounds drive shaft 3 of the compressor. Drive shaft 3 is rotatably supported in compressor housing 1 by bearings (not shown). The clutch assembly includes rotor 5 which is rotatably mounted on tubular extension 2 through bearing 4. Rotor 5 may be driven by an automobile engine (not shown) via belt 6. Rotor 5 is also provided with a plurality of concentric arcuate magnetic pole faces 5a at its axial end. The outer terminal end of drive shaft 3 extends from tubular extension 2 to hub 7 which is fixed on the end of drive shaft 3. Armature plate 8 is provided with concentric arcuate magnetic pole faces 8a and is flexibly joined to hub 7 by a plurality of leaf springs 9 in such a fashion that pole faces 8a are positioned facing pole faces 5a of rotor 5 with a predetermined axial air gap between them. Electromagnet 10 is mounted on compressor housing 1 eccentrically with drive shaft 3. Electromagnet 10 is fixed within annular hollow portion 5b which is formed in rotor 5 and has a surrounding air gap to facilitate passage of the magnetic field generated when electromagnet 10 is activated for attracting pole faces 8a of armature plate 8 to pole faces 5a of rotor 5. Thus, when electromagnetic coil 101 of electromagnet 10 is energized, pole faces 8a are attracted to pole faces 5a. Drive shaft 3 is then rotated when rotor 5 is turned by the engine. When electromagnet coil 101 of electromagnet 10 is not energized, pole faces 8a of armature plate 8 are separated from pole faces 5a of rotor 5 due to the spring bias of leaf springs 9. Thus, rotor 5 is permitted to rotate in response to the engine output, but drive shaft 3 is not driven.

In electromagnetic clutches of the type shown in FIG. 1, pole faces 5a of rotor 5 and faces 8a of armature plate 8 include a frictional surface for transmitting torque from rotor 5 to armature plate 8 when the pole face surfaces are engaged with each other. These frictional surfaces are finished by a polishing process. Therefore, each surface has an uneven irregular face as shown in FIG. 2. During the early stages of initial use of the clutch, the frictional surfaces of pole faces 5a and 8a securely engage with one another due to the roughness of each surface. Accordingly, a high level of torque is transferred. However, after the initial stages of use, the frictional surfaces suddenly begin to wear to a smoother finish, making secure engagement difficult. Accordingly, torque is no longer efficiently transferred from rotor 5 to armature plate 8. After subsequent engagements of pole faces 5a and 8a, their frictional surfaces tend to become rough again and the efficiency of torque transfer gradually increases. The decrease in torque transfer during the initial stages of clutch use and the gradual increase in torque transfer after subsequent engagements of the rotor and armature plate pole faces is shown in graph form in FIGS. 7(a) and 7(b). Graph I in both figures illustrate this phoenomenon in electromagnetic clutches known in the prior art and graphs II and III illustrate this phoenomenon in the electromagnetic clutch of the present invention as will be explained below.

In order to overcome the above-described disadvantage with respect to the loss of torque transfer efficiency during the initial stages of clutch operation, particularly the sudden reduction in torque transfer, the size of the frictional surfaces in electromagnetic clutches known in the prior art have been increased to provide more engagement surface for the rotor and armature plate pole faces. In other prior art electromagnetic clutches, the size of the magnetic coil is enlarged to increase the strength of its magnetic field. Accordingly, the rotor and armature plate pole faces are forced into more secure engagement. Although increasing the size of the frictional surface and/or the size of the magnetic coil improves the efficiency of torque transfer, these measures create other problems. For example, the size and weight of the clutch is significantly increased. In addition, the cost of the clutch is increased as well. These additional problems are alleviated somewhat by attempting to limit the increase in the size of the frictional surfaces and magnetic coil by frabricating the frictional surfaces with metal having a high coefficient of friction. However, such metals are very expensive and, therefore, are not a satisfactory alternative.

SUMMARY OF THE INVENTION

It is a primary object of the present invention to provide an electromagnetic clutch which has a high level of torque transfer.

It is another object of the present invention to provide an electromagnetic clutch wherein the torque transfer efficiency during the initial stages of clutch operation is increased.

It is still a further object of the present invention to provide an electromagnetic clutch wherein the torque transfer efficiency increases as the clutch is used.

It is a further object of the present invention to provide an electromagnetic clutch which accomplishes the above objects while at the same time being simple in construction and low in cost.

According to the present invention, an electromagnetic clutch is disclosed which comprises a rotor and armature plate which are rotatably supported on respective bearings. The rotor is provided with at least one annular groove in an outer portion thereof for receiving a belt for rotatably connecting the rotor to an external driving source. The rotor is also provided with an axial end magnetic frictional surface. The armature plate has an annular magnetic member which is capable of limited axial movement and has an axial end frictional surface which faces the magnetic frictional surface of the rotor, with an axial gap therebetween. The electromagnetic clutch of the present invention also includes an electromagnet device associated with the rotor for attracting the armature plate into engagement with the rotor via their respective frictional surfaces.

In one embodiment of the present invention, the frictional surfaces of the rotor and armature plate are finished by a machine tool and are then treated by a plating process. The machining and plating process help to maintain a high co-efficient of friction between the frictional surfaces, thereby improving the torque gransfer efficiency during the initial and subsequent stages of clutch operation.

Further objects, features and other aspects of the present invention will be understood from the following detailed description of the preferred embodiments of the present invention with reference to the annexed drawings.

DETAILED DESCRIPTION OF THE PREFERRED EMBODIMENTS

Figure 3:
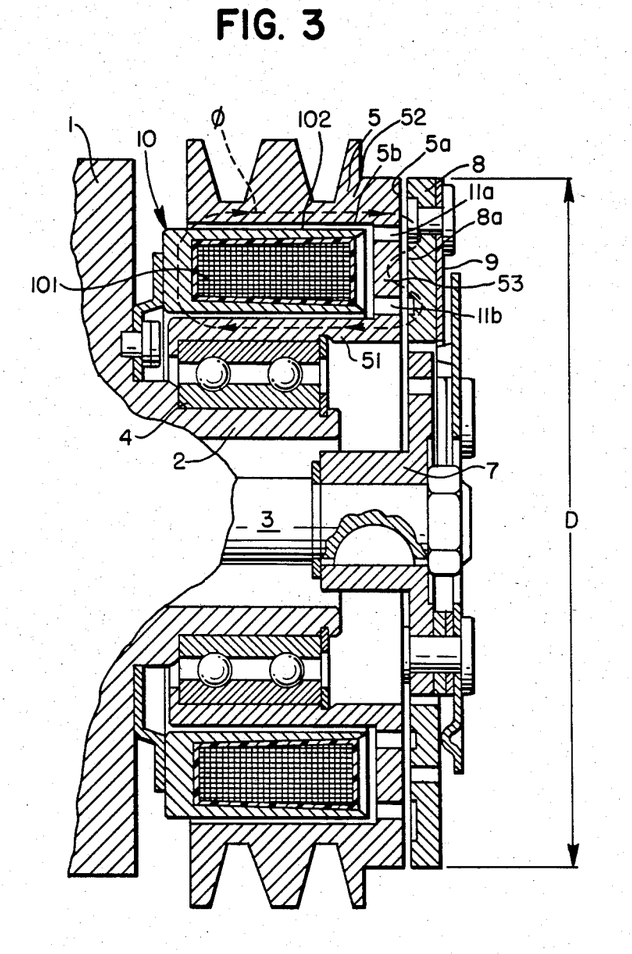
FIG. 3 is a cross-sectional view of an electromagnetic clutch in accordance with the present invention.
Figure 4:
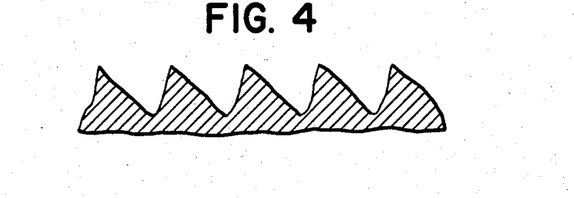
FIG. 4 is an illustrative cross-sectional view of the frictional surface of the rotor of the electromagnetic clutch shown in FIG. 3.

With reference to FIGS. 3 and 4, there is shown an embodiment of the present invention which is similar to the electromagnetic clutch shown in FIG. 1 except for the construction of the rotor. Therefore, similar parts are represented by the same reference numbers as shown in FIG. 1 and a detailed description of these parts is omitted.

In this embodiment of the present invention, rotor 5 is formed of an integrated body of magnetic material, such as steel, and comprises inner cylindrical portion 51, outer cylindrical portion 52 and end plate portion 53 which is connected at its axial end between both cylindrical portions 51 and 52. End plate portion 53 is provided with a plurality of concentrically arcuate slits 11a and 11b. These slits form concentric annular magnetic pole faces 5a which have a frictional surface.

The frictional surface of pole faces 5a of rotor 5 is finished by machining and is then plated. The cross-sectional configuration of the frictional surface of pole faces 5a after machining is shown in FIG. 4. Note that the rough surface is uniformly formed with the terminal end of each peak having an acute shape. The frictional surface is then treated with a uniform layer of plating. The plating layer may be 5–20 microns in thickness, for example. Pole faces 8a of armature plate 8 also have a frictional surface which is finished by polishing so that its cross-sectional configuration is the same as that shown in FIG. 2.

When electromagnet coil 101 is energized in the present embodiment, a magnetic field is generated with magnetic flux lines flowing through a closed loop comprising magnetic housing 102 of electromagnet 10, outer cylindrical portion 52, armature plate 8, axial end plate portion 53, armature plate 8 and inner cylindrical portion 51, as shown by a broken line in FIG. 3. Therefore, armature plate 8 is attracted to axial end plate 53 and is engaged with the frictional surface of pole faces 5a of rotor 5 via the frictional surface of pole faces 8a. Thus, drive shaft 3 is rotated together with rotor 5. When rotor 5 and armature plate 8 initially engage, the plating layer on the frictional surface of pole faces 5a of rotor 5 is shaved or worn off. The shaved particles of plating accumulate in the minute depressions which exist in the frictional surface of pole faces 8a of armature plate 8 as shown in FIG. 2. The large peak portions of the frictional surface of pole faces 8a of armature plate 8 are also shaved or worn off during initial engagement with the frictional surface of pole faces 5a of rotor 5. These particles also accumulate in minute depressions in the frictional surface of pole faces 8a and adhere to the particles of plating.

The adhered particles form a material which exhibits a great shearing resistance toward the rotating motion of rotor 5. Therefore, in comparison to electromagnetic clutches known in the prior art, the torque transferred by the magnetic clutch of the present invention is greatly increased.

The above-described adhered particles begin to form after several engagements of the frictional surface of pole faces 5a of rotor 5 with the frictional surface of pole faces 8a of armature plate 8. The amount of material formed continues to increase with each subsequent engagement. Therefore, the amount of torque transferred begins to increase from the initial stage of clutch usage and continues to increase thereafter. After the adhered material is formed, the shear preventing properties of the material do not change. Therefore, even if the magnetic force which holds the rotor and armature plate in engagement is reduced, a high level of torque transfer is maintained. Therefore, after engagement of rotor 5 and armature plate 8, the operating voltage to the electromagnet can be reduced.

Figure 5:
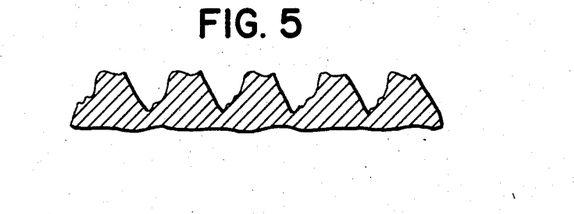
FIG. 5 is an illustrative cross-sectional view of the frictional surface in accordance with another embodiment of the rotor of the electromagnetic clutch of the present invention.

FIG. 5 illustrates a modified structure of the embodiment of the invention shown in FIGS. 3 and 4. In this embodiment, the terminal end of each uniformly formed peak on the frictional surface of pole faces 5a is machined to a trapezoidal shape.

Figure 7A:
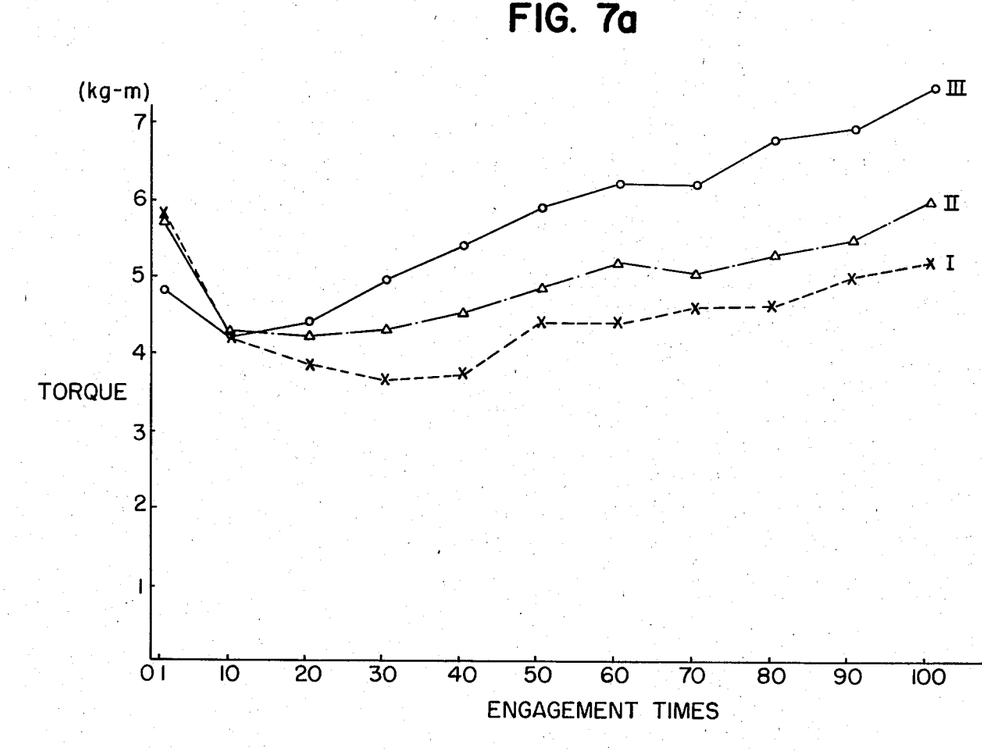
FIGS. 7a and 7b are graphs which illustrate changes in transfer torque corresponding to engagement times of the rotor and armature plate of the clutch.

With reference to FIG. 7a, the change in torque transfer corresponding to the number of engagements between rotor 5 and armature plate 8 is illustrated in graph form. Graph I is representative of electromagnetic clutches known in the prior art where the rotor and armature plate have the frictional surface shown in FIG. 2, i.e., the frictional surface has an uneven and irregular face. During the initial stages of clutch use, great torque transfer is obtained as mentioned above. However, after the rotor and armature plate have engaged several times via their respective frictional surfaces transfer torque is suddenly reduced due to the large peak portions on the frictional surfaces being worn away. Thereafter, however, subsequent engagements of the rotor with the armature plate will result in a slight increase in torque transfer as explained above.

Graphs II and III and representative of a magnetic clutch in accordance with the embodiments of the present invention. Graph II represents the embodiment of the present invention in which the finish of the frictional surface corresponds to the finish illustrated in FIG. 4, i.e., the frictional surface of pole faces 5a is machined to a rough surface uniformly formed with the terminal end of each peak having an acute shape. Graph III represents the embodiment of the present invention in which the finish of the frictional surface corresponds to the finish illustrated in FIG. 5, i.e., the frictional surface of pole faces 5a is machined to a rough surface uniformly formed with the terminal end of each peak having a trapezoidal shape.

During the initial stages of use, the torque transferred by the clutch of the present invention is smaller than the torque transferred by clutches known in the prior art, as shown in FIG. 7a. This situation exists because the frictional surface of the rotor and armature plate of the clutch of the present invention do not have the uneven and irregular face of prior art rotors and armature plates which provide for high initial torque transfer. However, after several engagements of the rotor with the armature plate of the present invention, the worn away metal and plating particles from the frictional surfaces adhere in minute depressions in the frictional surfaces to form a shear resistant material. Accordingly, the amount of torque transferred begins to increase, as shown in FIG. 7(a), Graphs II and III. The increase is at a more rapid and sustained rate than in magnetic clutches known in the prior art.

In the embodiment of the invention having the frictional surface illustrated in FIG. 5, the trapezoidal shape of the surface peaks provides increased contact surface between the rotor and armature plate frictional surfaces. Accordingly, the efficiency of torque transfer is further increased as shown by Graph III in FIG. 7(a).

Figure 6:
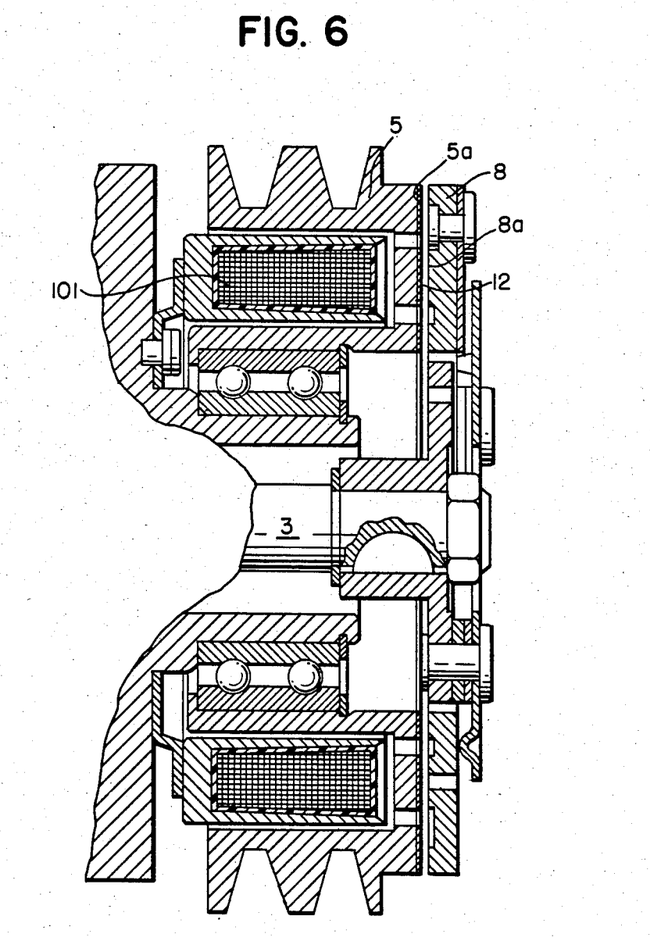
FIG. 6 is a cross-sectional view of an electromagnetic clutch in accordance with another embodiment of the present invention.

Referring to FIG. 6, another embodiment of an electromagnetic clutch in accordance with the present invention is shown. In FIG. 6, similar parts are represented by the same reference numerals as the embodiment shown in FIGS. 3–5. Thus, a detailed description of similar parts will be omitted in order to simplify the description. The frictional surface of pole faces 5a of rotor 5 is provided with a thin film layer 12. Film layer 12 is formed from a powder such as epoxide-silicon resin. Epoxide-silicon resin is a silicon resin modified with epoxy. The thickness of layer 12 can be 2–4 times the surface roughness of the frictional surface of pole faces 5a, i.e., the maximum depth of the irregular depressions. A ceramic resin powder or a magnetic material powder may also be used to form layer 12.

In this embodiment, when electromagnetic coil 101 is energized, the frictional surface of pole faces 8a of armature plate 8 is attracted to rotor 5 and is engaged with frictional surface of pole faces 5a of rotor 5. Particles of material from powder layer 12 are shaved off by the engagement and these particles embed themselves in the minute depressions which exist in the frictional surface of pole faces 8a. The large peak portions of the frictional surface of pole faces 8a are also shaved and worn during the initial engagements between rotor 5 and armature plate 8. Thus, particles from the frictional surface of pole faces 8a also aggregate in the minute depressions and adhere to the powder particles.

Figure 7B:
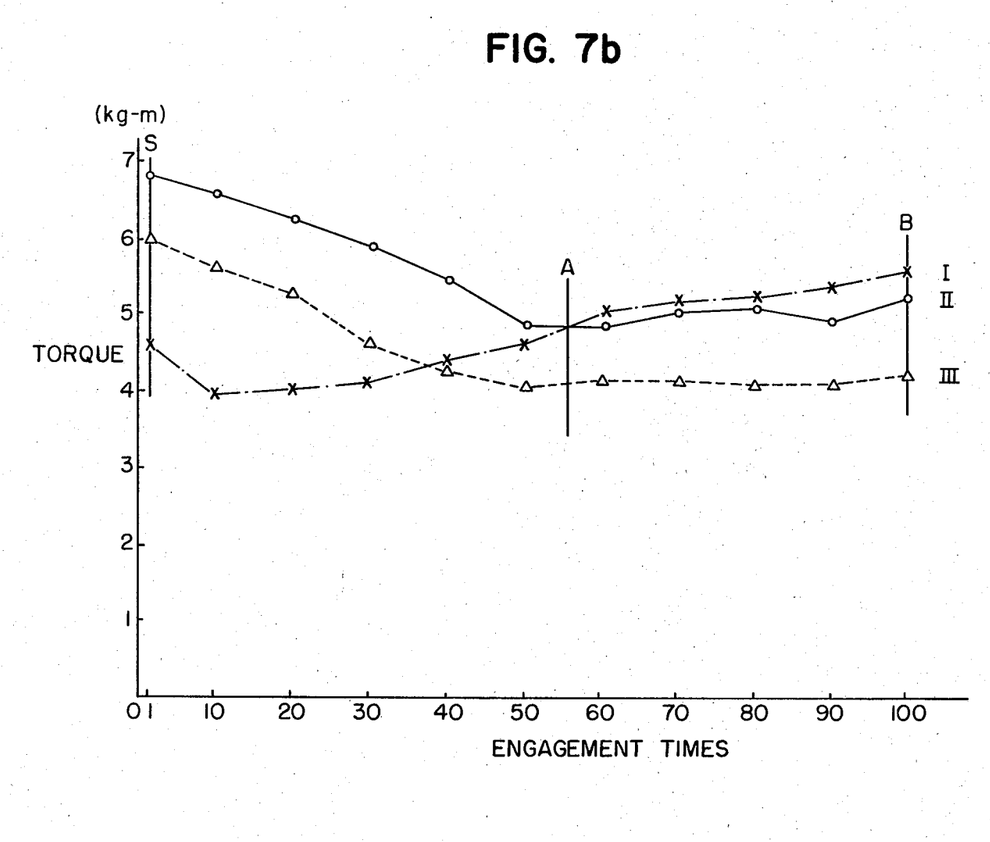

Referring to FIG. 7b, the change in torque transfer corresponding to engagement times with rotor 5 and armature plate 8 will be explained with respect to a further embodiment of the present invention. Graph I shows the prior art clutch which was explained with reference to FIG. 7a. Graph II represents a clutch which is provided with the same diameter rotor 5 as prior art clutches and graph III represents a clutch which is provided with a smaller diameter rotor 5 than prior art clutches. Rotor 5 of the clutches whose performance is illustrated in Graphs II and III includes a frictional surface of pole faces 5a in accordance with the present invention as described above. As shown in FIG. 7b, the torque transferred by the clutches having a frictional surface in accordance with the present invention is increased during the initial stages of clutch use, i.e., in comparison with clutches known in the prior art, the transfer torque of graph II is increased about 60% and graph III is increased about 37%.

This invention has been described in detail in connection with the preferred embodiments, but these are examples only and this invention is not restricted thereto. It will be easily understood by those skilled in the art that other variations and modifications can be made within the scope of this invention.

What is claimed is:

1. In an electromagnetic clutch comprising a first rotatable member rotatably supported on a first bearing, said first rotatable member being provided with at least one annular groove along an outer surface thereof for receiving a belt rotatably connecting said first rotatable member to an external driving source, said first rotatable member further having an axial end magnetic frictional surface, a second rotatable member rotatably supported on a second bearing, an annular magnetic member being supported on said second rotatable member so as to be capable of limited axial movement and having an axial end magnetic frictional surface which faces said axial end magnetic frictional surface of said first rotatable member with an axial gap therebetween, and electromagnetic means associated with one of said rotatable members and said annular magnetic member for attracting the other of said rotatable members, the improvement comprising one of said axial end frictional magnetic surfaces having a thin layer portion at an axial end face thereof and the other of said axial end frictional magnetic surface being finished to form a rough surface with a plurality of uniformly formed peaks and valleys, said thin layer portion being formed of a material which can be readily shaved or worn off during operation of said electromagnetic clutch to form particles which accumulate in said peaks and valleys, whereby the accumulation of said particles in said peaks and valleys increase the torque transfer rate of said electromagntic clutch.

2. The electromagnetic clutch of claim 1, wherein said thin layer portion is a plated covering.

3. The electromagnetic clutch of claim 2, wherein said frictional surface having said peaks and valleys is finished by a machining tool.

4. The electromagnetic clutch of claim 2, wherein at least some of said peaks have a trapezoidal shape.

5. The electromagnetic clutch of claim 2, wherein at least some of said peaks have an acute shape.

6. The electromagnetic clutch of claim 2, wherein the thickness of said plated covering is 5 to 20 microns.

7. The electromagnetic clutch of claim 1, wherein said thin layer portion is formed from a powder material.

8. The electromagnetic clutch of claim 7, wherein said powder material comprises an epoxide-silicon resin powder.

9. The electromagnetic clutch of claim 7, wherein said powder material comprises a ceramic resin powder.

10. The electromagnetic clutch of claim 7, wherein said powder material comprises a magnetic powder.

11. The electromagnetic clutch of claim 1, wherein the thickness of said thin layer portion is 2 to 4 times the maximum depth of any irregular depressions which exist on said frictional surface having said peaks and valleys.

* * * * *

UNITED STATES PATENT AND TRADEMARK OFFICE
CERTIFICATE OF CORRECTION

PATENT NO. : 4,632,236

DATED : December 30, 1986

INVENTOR(S) : Takatoshi Koitabashi

It is certified that error appears in the above-identified patent and that said Letters Patent is hereby corrected as shown below:

Column 6, line 43, after "portion" insert -- being finished to form a rough surface with a plurality of uniformly formed peaks and valleys --.

Column 6, line 46, delete "with a plurality of uniformly formed peaks and valleys".

Signed and Sealed this

Twenty-second Day of December, 1987

Attest:

DONALD J. QUIGG

*Attesting Officer*        *Commissioner of Patents and Trademarks*